No. 848,161. PATENTED MAR. 26, 1907.
H. H. DIERIG.
PROCESS OF MANUFACTURING METAL WORKING TOOLS.
APPLICATION FILED JUNE 22, 1904.
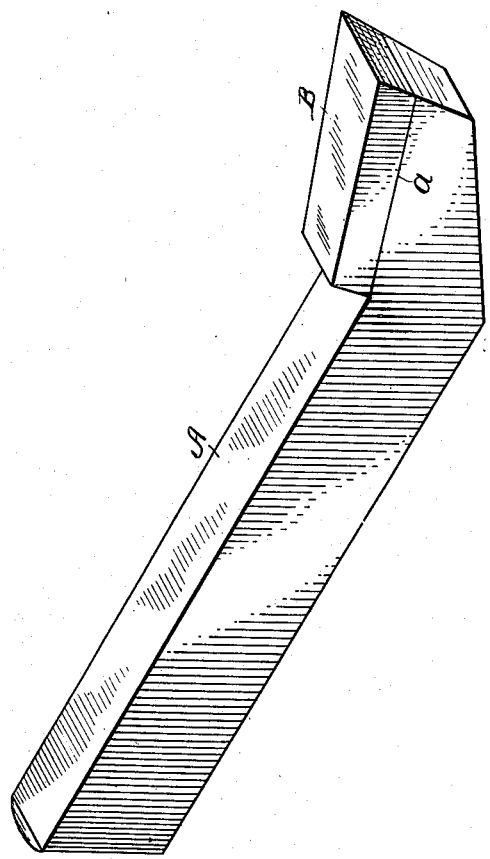
Witnesses:
Otto A. Earl
Adelaide S. Adams
Inventor,
Herman H. Dierig
By Fred L. Chappell
Atty.

UNITED STATES PATENT OFFICE.

HERMAN H. DIERIG, OF DAYTON, KENTUCKY, ASSIGNOR, BY DIRECT AND MESNE ASSIGNMENTS, TO JOHN G. MATTHEWS, OF THREE RIVERS, MICHIGAN.

PROCESS OF MANUFACTURING METAL-WORKING TOOLS.

No. 848,161.          Specification of Letters Patent.          Patented March 26, 1907.

Application filed June 22, 1904. Serial No. 213,715.

*To all whom it may concern:*

Be it known that I, HERMAN H. DIERIG, a citizen of the United States, residing at the city of Dayton, county of Campbell, State of Kentucky, have invented certain new and useful Improvements in Processes of Manufacturing Metal-Working Tools, of which the following is a specification.

This invention relates to improvements in the process of manufacturing metal-working tools.

The object of this invention is to provide an improved process of manufacturing metal-working tools, whereby expensive high-speed steel can be made use of for the cutting part and satisfactorily united or joined to a shank or body of common steel or other cheaper metal.

I accomplish the objects of my invention by the devices and means described in the following specification.

The invention is clearly defined and pointed out in the claims.

A structure embodying the features of my invention is clearly illustrated in the single figure of the accompanying drawing, forming a part of this specification, in which the shank A is made of common steel or other suitable metal. The cutting portion B of the tool is made of air-hardening or self-hardening steel or "high-speed steel," as it is sometimes called. A steel that I have used with success is that made by the Firth-Stirling Steel Company, of Pittsburg, Pennsylvania, known as the "Blue Chip" high-speed steel. Another make, known as the "Novo," has been used by me with success. Any of these standard high-speed steels can be used.

A portion of the shank or body A is dressed off smooth, and a small piece of high-speed steel shaped to form the cutting part of the tool is fitted to the dressed-off part, as accurately as the ordinary machine-shop methods will permit, the same being fitted so that there is a bearing-surface over a considerable portion of its area. Of course some very slight interstices are between the two parts. The piece of high-speed steel is then clamped in position on the shank by winding a piece of wire around the same or securing it by a suitable screw therethrough, or by driving a pin through the same into the shank, or by any suitable means for retaining the same in comparatively close contact with the body or shank during the time of brazing and hardening. The temperature of the tool is then raised to the proper point for hardening the high-speed steel, which temperature is sufficiently high for the melting of a suitable spelter or solder. The tool is then treated while it is being heated with a suitable flux, and solder or spelter is applied thereto, which readily enters the interstices between the high-speed steel and the shank, and on cooling the tool from the proper temperature to secure the hardening the spelter or solder will be set between the high-speed steel and the shank, forming a bond and retaining the same securely in position, so that the tool can be ground to an edge and made use of as though it was made of an integral piece of suitable steel. The cooling can be effected by air-blast, oil, or in any other way appropriate to harden the particular kind of high-speed steel used. The particular solder which I use with the self-hardening steel to which I have referred is an alloy containing a large per cent. of copper, the same being admixed with brass or tin. Pure copper has also been used by me as solder with success. Any strong solder will answer the purpose, although a solder high in copper is preferred. To secure the best results, it is required that the solder be fusible and that it flow readily at a temperature just a little below the temperature for hardening the self-hardening steel. This secures the best results and makes it possible to properly harden and braze the cutting-piece in place at the same operation.

The method I have described is most readily made use of in applying high-speed steel to a perfectly flat surface; but it is obvious that the surfaces may be suitably conformed to each other. It is of course needless to remark that the high-speed steel when put in position is in its annealed condition, so that it will be tempered and hardened by the brazing process.

Having thus described my invention, what I claim as new, and desire to secure by Letters Patent, is—

1. The method of brazing a cutter of high-speed-steel alloy to an iron or carbon steel shank which consists of fitting a piece of high-speed steel alloy to the softer metal, heating the two to the temperature at which the high-speed steel alloy will harden when cooled, applying the brazing metal, the fusing-point of which brazing metal is somewhat below the temperature to which the high-speed-steel alloy is heated in the hardening operation, in such a manner as to utilize this same heat to form a hard solder joint or bond between the parts of the metal, and then so cooling as to harden the high-speed steel and secure the proper brazing at the same operation.

2. The method of brazing a cutter of high-speed-steel alloy to an iron or carbon steel shank which consists of fitting a piece of high-speed-steel alloy to the softer metal, heating the two to the temperature at which the high-speed-steel alloy will harden when cooled, applying the brazing metal in such manner as to utilize this same heat to form a hard solder joint or bond between the parts of the metal, and then so cooling as to harden the high-speed steel and secure the proper brazing at the same operation.

In witness whereof I have hereunto set my hand and seal in the presence of two witnesses.

HERMAN H. DIERIG. [L. S.]

Witnesses:
B. A. JEFFERY,
CHAS. W. YUNGBLUT.